(12) United States Patent
Shore et al.

(10) Patent No.: US 7,648,282 B2
(45) Date of Patent: Jan. 19, 2010

(54) SPHERICAL BEARING ARRANGEMENT

(75) Inventors: David Shore, Lincoln (GB); Philippe Dupuis, Lincoln (GB); Allen Christopher Clarke, Lincoln (GB); Bob Middlemass, Lincoln (GB)

(73) Assignee: Minebea Co. Ltd., Nagano (JP)

( * ) Notice: Subject to any disclaimer, the term of this patent is extended or adjusted under 35 U.S.C. 154(b) by 675 days.

(21) Appl. No.: 11/232,824

(22) Filed: Sep. 21, 2005

(65) Prior Publication Data

US 2006/0062501 A1    Mar. 23, 2006

(30) Foreign Application Priority Data

Sep. 22, 2004    (GB)    ................. 0421122.3

(51) Int. Cl.
*F16C 23/04*    (2006.01)
*F16C 25/04*    (2006.01)

(52) U.S. Cl. ................ 384/211; 384/208; 384/206; 384/192; 384/213

(58) Field of Classification Search ........... 384/206, 384/208–212, 216, 217; 29/898.043, 898.056, 29/898.059, 898.044, 898.045; 411/222, 411/237, 268, 931, 935
See application file for complete search history.

(56) References Cited

U.S. PATENT DOCUMENTS

| | | | | | |
|---|---|---|---|---|---|
| 257,854 | A | * | 5/1882 | Dillon | ........................ 411/222 |
| 262,579 | A | * | 8/1882 | Dillon | ........................ 411/237 |
| 1,346,730 | A | * | 7/1920 | Viebrock et al. | ............ 411/935 |
| 2,478,056 | A | | 8/1949 | Reeg | |
| 2,518,469 | A | * | 8/1950 | Harding | ....................... 411/237 |
| 3,893,736 | A | | 7/1975 | McCloskey | |
| 3,989,321 | A | * | 11/1976 | McCloskey | .................. 384/211 |
| 3,989,322 | A | * | 11/1976 | McCloskey | .................. 384/212 |
| 4,005,514 | A | * | 2/1977 | McCloskey | ............ 29/898.043 |
| 4,077,681 | A | | 3/1978 | McCloskey | |
| 4,251,122 | A | | 2/1981 | McCloskey | |
| 5,328,273 | A | * | 7/1994 | Nonaka et al. | .............. 384/206 |
| 6,209,206 | B1 | * | 4/2001 | Harris et al. | ........... 29/898.043 |
| 6,729,763 | B2 | * | 5/2004 | Post et al. | .................... 384/213 |
| 2003/0095729 | A1 | * | 5/2003 | Post et al. | .................... 384/213 |

FOREIGN PATENT DOCUMENTS

| | | |
|---|---|---|
| DE | 2501849 A1 | 7/1975 |
| EP | 0913595 | 5/1999 |
| EP | 1431597 | 6/2004 |

(Continued)

OTHER PUBLICATIONS

European Patent Office, "Communication -European Search Report" for European Application No. EP05014567.1, Feb. 27, 2008, 6 pages.

(Continued)

*Primary Examiner*—Marcus Charles
(74) *Attorney, Agent, or Firm*—Klarquist Sparkman, LLP

(57) ABSTRACT

A spherical bearing arrangement comprising: a bearing housing; a plurality of split-ball portions which are together arranged in the housing to produce a composite ball having a spherical bearing surface, the composite ball having a bore passing therethrough, the bore having a central axis; and a bushing secured in the bore of the composite ball. A method of assembling a spherical bearing arrangement is also disclosed.

19 Claims, 5 Drawing Sheets

FOREIGN PATENT DOCUMENTS

GB          2328484 A  *  2/1999

OTHER PUBLICATIONS

Chinese Patent Office, Chinese Examination Report for Chinese Application No. 2005101031830, 6 pages.

English translation of the text of the Chinese Examination Report for Chinese Application No. 2005101031830, 3 pages.
Combined Search and Examination Report for corresponding UK Patent Application No. GB0421122.3, Feb. 2, 2005.
Examination Report for corresponding UK Patent Application No. GB0421122.3, Jul. 22, 2005.

* cited by examiner

SPHERICAL BEARING ARRANGEMENT

CROSS REFERENCE TO RELATED APPLICATION

This application claims the benefit of Great Britain Patent Application No. GB 0421122.3, filed on Sep. 22, 2004, which is incorporated herein by reference.

FIELD

The present invention relates to a spherical bearing arrangement and a method of assembly thereof.

BACKGROUND

The art of spherical bearings and indeed bearings in general, requires the provision of precision engineered bearing surfaces wherein tolerances must be strictly adhered to ensure the smooth and effective operation of the bearings. As a consequence of keeping within these tolerances, bearings, and especially spherical bearings, are often expensive to manufacture.

Mounting the ball into the housing of a spherical bearing arrangement has proved difficult, since any method must result in the torque of the bearing being substantially zero. A conventional method is to provide a single ball and swage the housing around the ball to fixedly retain it therein. However, ensuring the torque of such a bearing remains within a predetermined range has proved difficult.

Spherical bearings comprising a split-ball arrangement go some way to alleviating the problems associated with single ball spherical bearings. Such an arrangement commonly comprises two split-ball portions which, when mounted together in the bearing housing, collectively define a split-ball arrangement which serves, in principle, as the ball of a single-ball spherical bearing arrangement.

The main advantage of split-ball bearings is that they do not require swaging of the bearing housing and thus reduce manufacturing costs. The split-ball portions are mounted in turn, with one portion being installed into the housing and engaging with the bearing surface, and the second portion being inserted and twisted by 90° to coincide with the other split ball portion. Consequently, it is easier to produce a split ball spherical bearing having a torque of substantially zero, since each part can be manufactured separately from one another.

Since spherical bearings are commonly used in the aerospace industry, weight is of paramount importance. It is desirable, therefore, to manufacture spherical bearings from a lightweight material, such as titanium or a titanium alloy. However, such a material does not offer the most desirable wear characteristics. In use, a shaft is commonly located in a bore passing through the ball of a spherical bearing. Over time, because the lightweight material of the bore does not offer a good wear surface, the bore bearing surface degrades, and the life of the bearing is shortened. The spherical bearing arrangement may therefore need to be scrapped at great financial cost.

In the case of a single-ball spherical bearing arrangement, a bushing can be interference fit in the bore to reduce wear on the ball. However, in the case of a split ball bearing arrangement, an interference fit bushing cannot be used without affecting the torque of the split ball bearing arrangement. Therefore, bushings are not used in split ball arrangements.

There is therefore a need for a split ball bearing arrangement manufactured from a lightweight material, but offering suitable wear characteristics for a shaft passing therethrough.

SUMMARY

The present invention provides a spherical bearing arrangement which seeks to overcome the aforementioned problems.

Accordingly, one aspect of the present invention provides a spherical bearing arrangement comprising: a bearing housing; a plurality of split-ball portions which are together arranged in the housing to produce a composite ball having a spherical bearing surface, the composite ball having a bore passing therethrough, the bore having a central axis; and a bushing secured in the bore of the composite ball.

Preferably, there is no separation between the split-ball portions.

Alternatively, there may be separation between the split-ball portions.

Advantageously, the bushing is secured with a non-interference fit in the bore of the composite ball.

Conveniently, the bushing is secured in the bore of the composite ball so as to prevent axial displacement of the bushing in the bore.

Preferably, the split ball portions are substantially identical to each other.

Advantageously, there are two split ball portions.

Conveniently, the material of the bushing is pre-selected to be different to the material of the composite ball.

Preferably, a shaft is to be inserted into the bushing and the material of the bushing is pre-selected so as to offer desirable wear characteristics between the bushing and shaft.

Advantageously, the material of the bushing is a copper alloy.

Conveniently, the material of the composite ball is titanium or a titanium alloy.

Another aspect of the present invention provides a method of assembling a spherical bearing arrangement, the arrangement comprising a bearing housing; a plurality of split-ball portions; and a bushing, the method comprising the steps of: inserting the plurality of split-ball portions into the bearing housing so as to define a composite ball having a bore passing therethrough; and securing the bushing into the bore of the composite ball.

Preferably, the plurality of split-ball portions are inserted into the bearing housing sequentially, prior to securing the bushing in the bore.

BRIEF DESCRIPTION OF THE DRAWINGS

The present invention will now be described, by way of example, with reference to the accompanying figures, in which.

DETAILED DESCRIPTION

Figure 1:
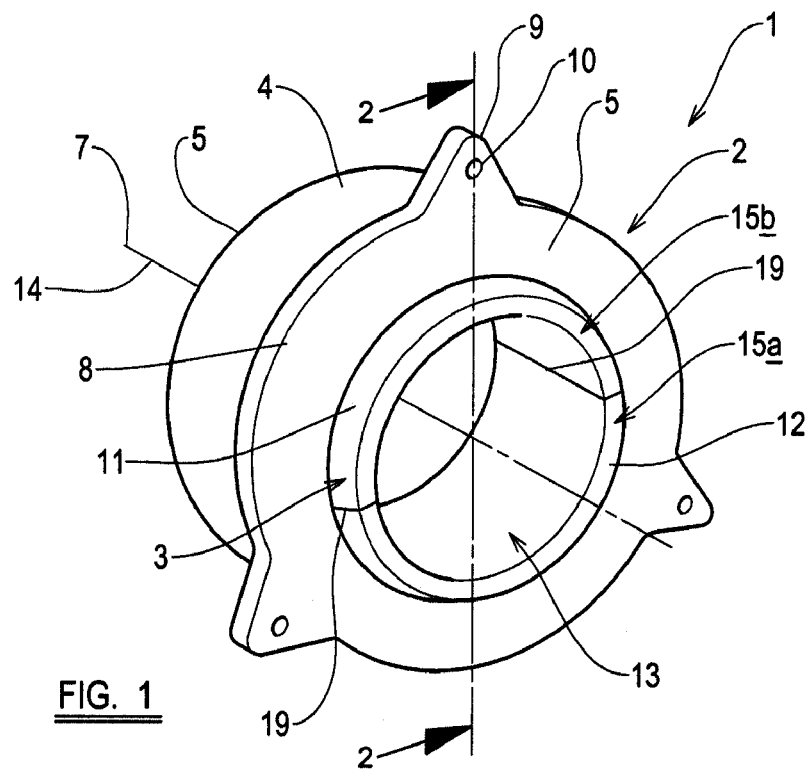
FIG. 1 shows a perspective view of a spherical bearing arrangement.
Figure 2:
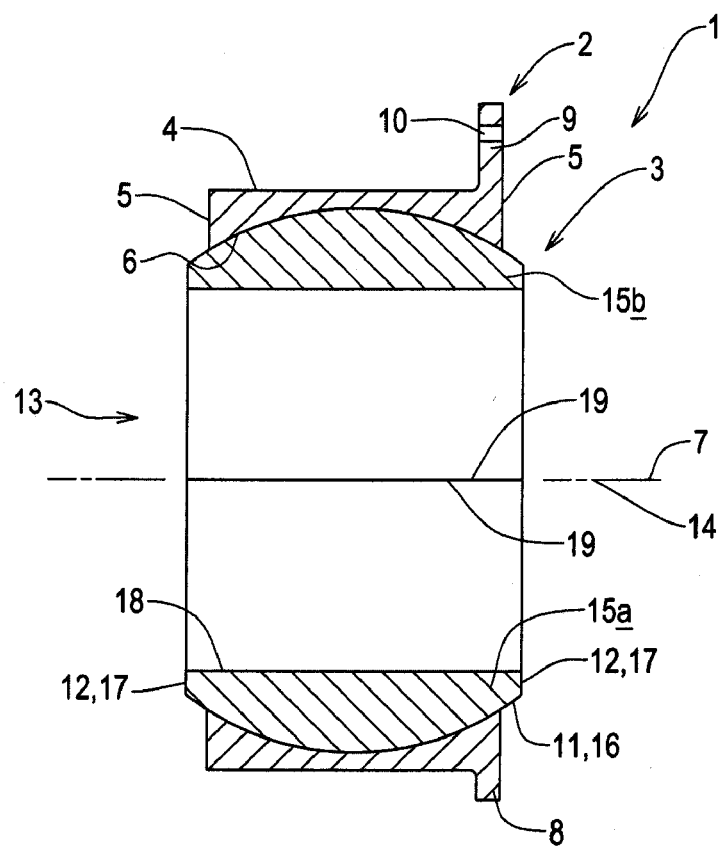
FIG. 2 shows a cross section of the spherical bearing arrangement of FIG. 1 along line 2-2.

FIGS. 1 and 2 show a spherical bearing arrangement 1, comprising a bearing housing 2 with a composite ball 3 mounted therein. The bearing housing 2 is substantially annular and comprises: a cylindrical outer surface 4; two axial end faces 5; and an inner surface comprising a spherical housing bearing surface 6. The bearing housing 2 further has a central axis 7. The bearing housing 2 has a circumferential, radially extending flange 8 proximate an axial end face 5 of the bearing housing 2. The flange 8 carries three equi-spaced lobes 9 which each protrude from the flange 8. The equi-spaced lobes 9 are each provided with an aperture 10 through which a bolt or the like can pass, for fixing the bearing housing 2 by the lobes 9 to another object.

The composite ball 3 is substantially spherical in shape, providing: a spherical composite ball bearing surface 11; two axial end faces 12; and a bore 13 with a central axis 14. The composite ball bearing surface 11 conforms to the housing bearing surface 6 such that the bearing surfaces 6, 11 are in sliding contact with one another. Preferably, there is zero torque between the composite ball 3 and the bearing housing 2.

The composite ball 3 is formed from two substantially identical split-ball portions 15a, 15b. Each split ball portion 15a, 15b comprises: a hemi-spherical split ball bearing surface 16; two axial end faces 17; a semi-cylindrical inner surface 18 defining one half of the composite ball bore 13; and two separation faces 19. The separation faces 19 of each split ball portion 15 are substantially co-planar.

Preferably, the split ball portions 15a, 15b and the bearing housing 2 are made of titanium, a titanium alloy, or some other suitable light weight material. More preferably, the split ball portions 15a, 15b and bearing housing 2 are made of titanium alloy TA6V as per ASNA3307. Advantageously, the titanium alloy is coated with titanium nitride using a plasma assisted physical vapour deposition method.

Figure 3:
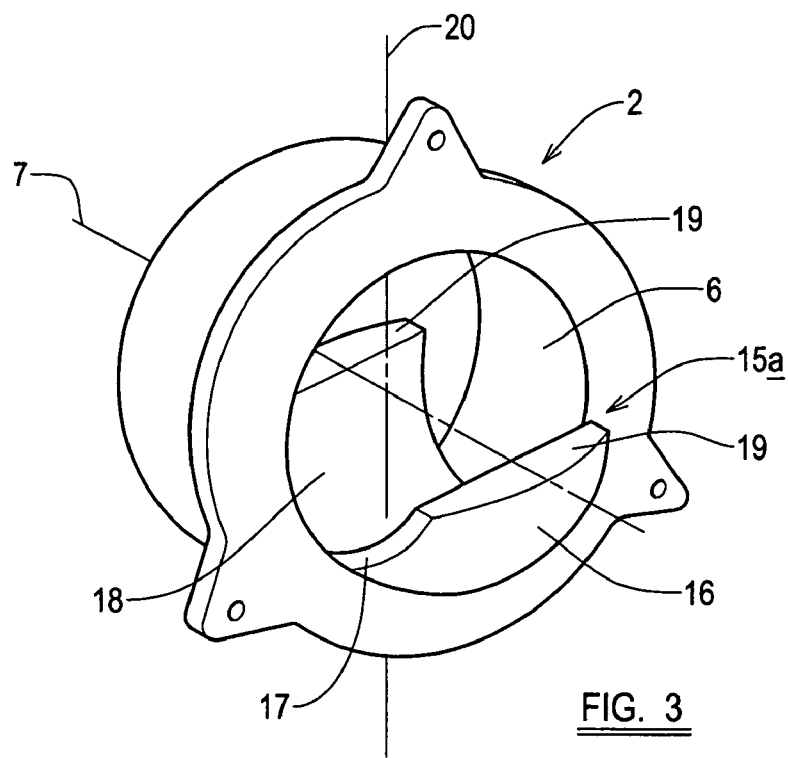
FIGS. 3-5 show stages of assembly for the spherical bearing arrangement of FIGS. 1 and 2.
Figure 4:
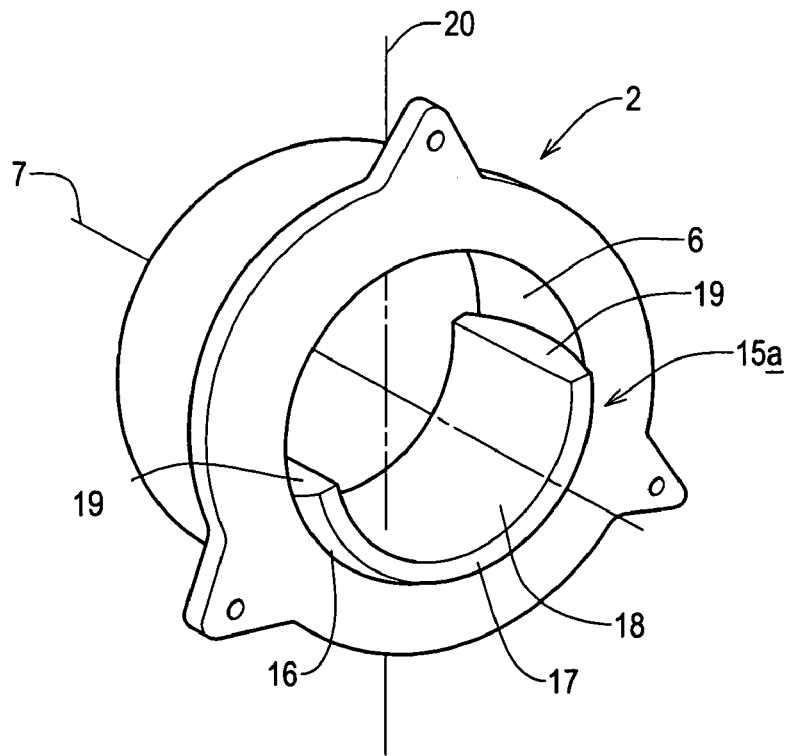
Figure 5:
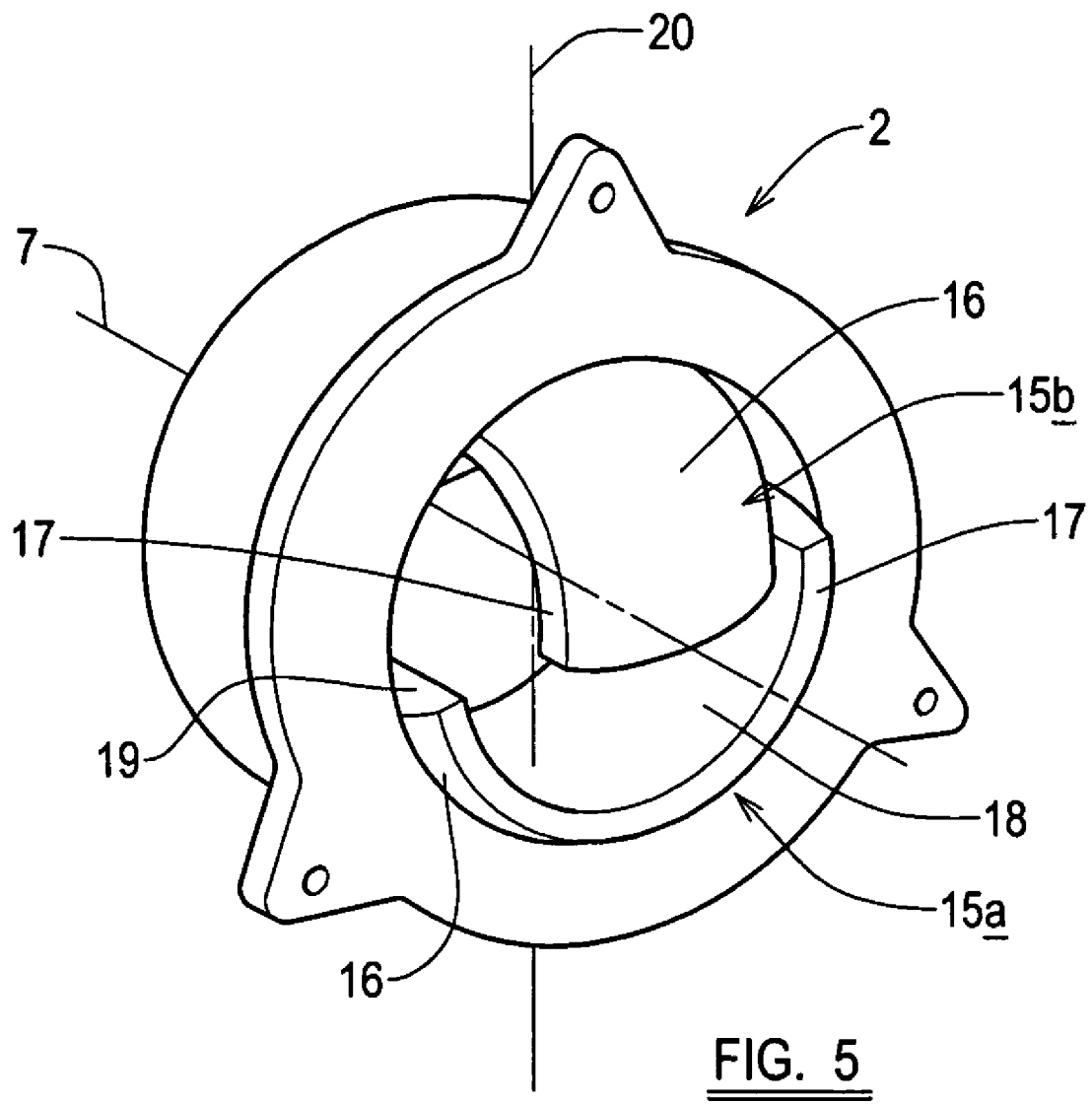

FIGS. 3 to 5 show stages of assembly for the spherical bearing arrangement 1 of FIGS. 1 and 2. FIG. 3 shows the bearing housing 2 of FIGS. 1 and 2 with split ball portion 15a seated therein, so that the split ball bearing surface 16 contacts the housing bearing surface 6. The split ball portion 15 is then rotated by 90 degrees about an axis 20 perpendicular to the bearing housing central axis 7, so that more of the split ball bearing surface 16 is contacting the housing bearing surface 6. Such an arrangement is shown in FIG. 4. It will be appreciated that when in the position shown in FIG. 4, the axial end faces 17 of the split ball portion 15a will be parallel to the respective axial end faces 5 of the bearing housing 2.

Split ball portion 15b is then inserted into the bearing housing 2 in a similar manner to split ball portion 15a, so that the split ball bearing surface 16 contacts the housing bearing surface 6. Such an arrangement is shown in FIG. 5.

Preferably, to aid insertion of split ball portion 15b, the axial length of the split ball portions 15a, 15b is smaller than the diameter of the composite ball bore 13, but this is not essential.

As with split ball portion 15a, split ball portion 15b is then rotated by 90 degrees about an axis 20 perpendicular to the bearing housing central axis 7, so that more of the split ball bearing surface 16 is contacting the housing bearing surface 6. Such an arrangement is shown in FIGS. 1 and 2. Consequently, the respective separation faces 19 of the two split ball portions 15a, 15b slide over one another and are preferably frictionally engaged with one another.

It will be appreciated that, in the orientation described, with reference to FIGS. 1 and 2, the central axis 14 of the composite ball 3 will be coaxial with the central axis 7 of the bearing housing 2.

As aforementioned, the torque of the spherical bearing arrangement 1 (between the composite ball bearing surface 11 and the housing bearing surface 6) is preferably zero. The composite ball 3 can therefore rotate freely within the bearing housing 2. It is possible, therefore, for the split ball portions 15a, 15b to misalign with respect to one another, thus not offering a purely cylindrical bore 13 for the insertion of a shaft. Such misalignment can occur either by the separation faces 19 sliding in relation to one another, or by the separation faces 19 moving toward or away from one another. However, in accordance with embodiments of the present invention, a bushing 22 is provided in the bore 13 of the composite ball 3.

Figure 6:
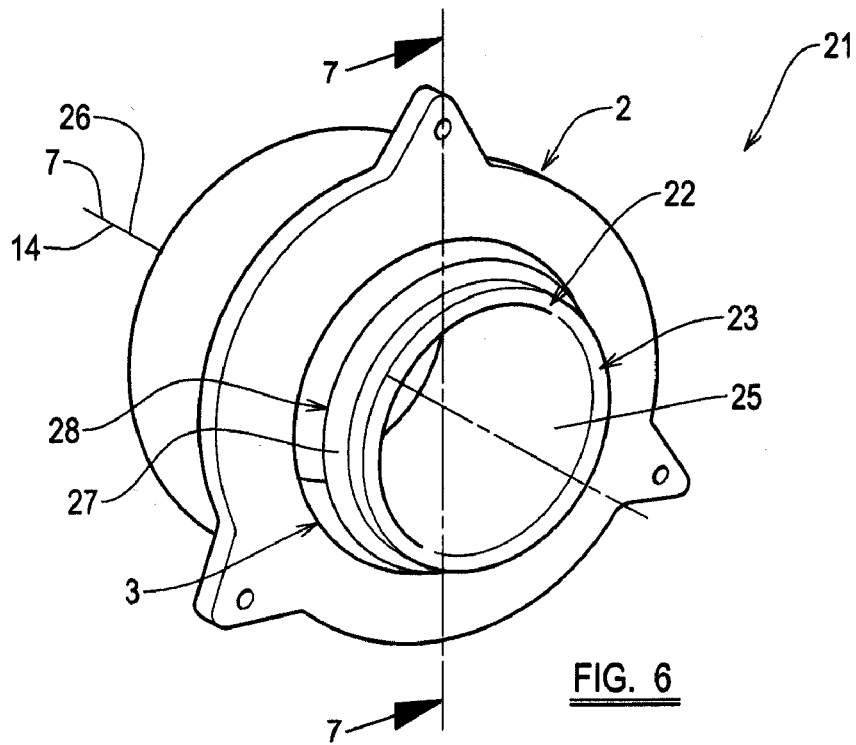
FIG. 6 shows a perspective view of a spherical bearing arrangement embodying the present invention.
Figure 7:
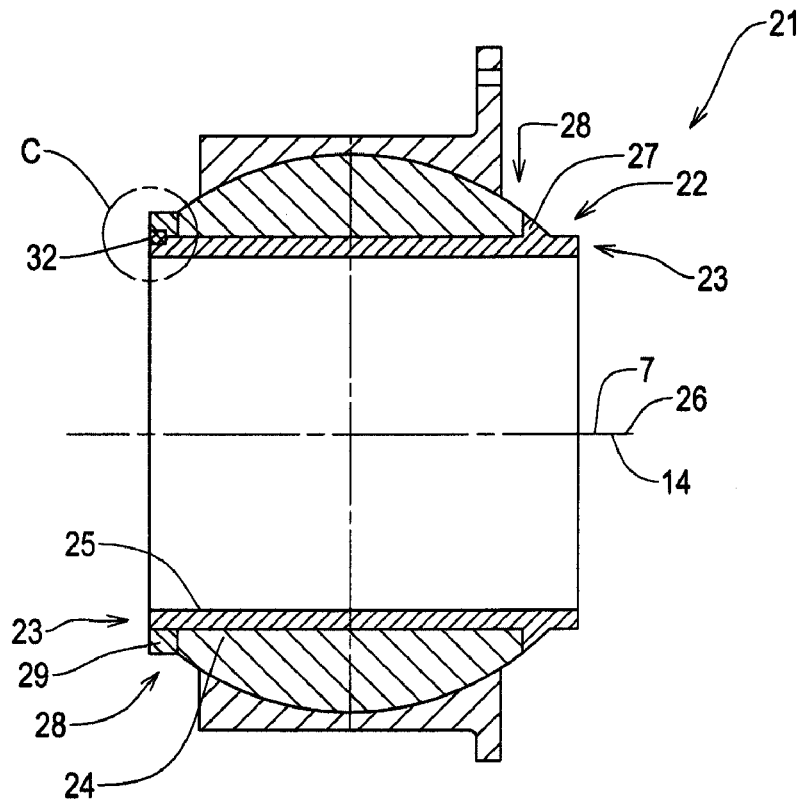
FIG. 7 shows a cross section of the spherical bearing arrangement of FIG. 6 along line 7-7.

The spherical bearing arrangement 21 of FIGS. 6 and 7 comprises the bearing housing 2, with the composite ball 3 mounted therein and a bushing 22 which is secured in the bore 13 of the composite ball 3. The bushing 22 is cylindrical, and comprises: two axial ends 23; an outer surface 24 and an inner surface 25; and a central axis 26. Preferably, the bushing 22 is made of copper alloy. More preferably, the bushing 22 is made of beryllium copper, CuBe 1.9 as per ASNA3417. The material of the bushing 22 offers a better wear surface than the material of the bore 13 of the composite ball 3.

Figure 8:
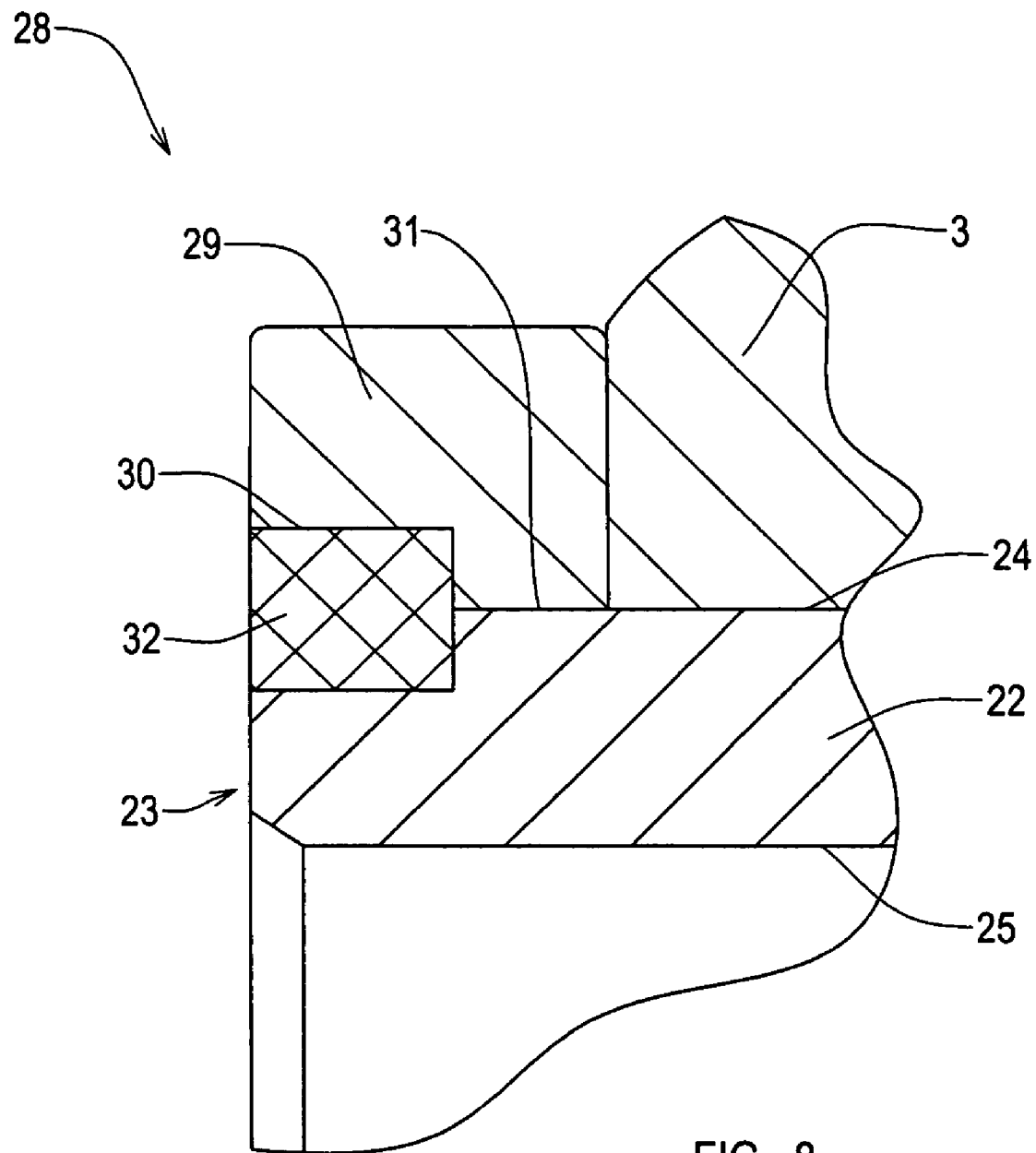
FIG. 8 shows an enlarged cross section of area C of FIG. 7.

An annular flange 27 is located at one axial end 23 of the bushing 22 and projects radially outwardly to provide a stop 28. The outer surface of the other axial end 23 of the bushing 22 is threaded so as to receive a correspondingly threaded nut 29 to provide a further stop 28. The nut 29 is preferably made of copper. Preferably, as shown in FIG. 8, at least one hole 30 is drilled at the interface 31 between the threaded portion of the bushing 22 and the nut 29 and a peg 32 secured therein. Such an arrangement is known in the art as "pegging". By securing a peg 32 into the hole 30, the nut 29 is locked with respect to the threaded portion, so that movement between these parts is prevented—thus, the nut 29 does not become loose during use. The peg 32 is preferably made of steel.

Alternatively, the stop 28 at each end of the bushing 22 could comprise a nut 29 and threaded portion arrangement.

The provision of a stop at both ends of the bushing allows the bushing to be retained in the composite ball when subjected to axial forces, such as those encountered in landing gear Pintle bearings. When assembled, axial displacement of the bushing relative to the composite ball is prevented by abutment of one of the stops against a respective axial end face of the composite ball. Whilst, in use, these axial forces may act in both directions along the central axis of the bushing. It is also envisaged that any axial force could normally be present in only one direction so there would only need to be one stop located at an axial end of the bushing. Such a singular stop could comprise either a flange, or a nut and threaded portion arrangement.

It is critical that when the bushing is subjected to axial forces, in normal use, the bearing still operates effectively. That is to say: the torque experienced between the composite ball and the housing must remain within a predetermined range, regardless of the level or direction of axial force imposed on the bushing. Securing the bushing with a non-interference fit in the composite ball is critical and conveniently prevents any unwanted variation in torque between the composite ball and housing. This is different to the arrangement provided in the prior art, for example in U.S. Pat. No. 4,251,122.

When the spool member 22 of the arrangement in US '122 is subjected to an axial force, the spool member 22 moves with respect to the housing. However, because of the mating threads provided on the inner surface of the spherical segments 26 and the outer surface of the spool member 22, any axial movement between these two parts will cause the respective threads to "ride up" upon one another, having the effect that the spherical segments will move radially outwardly from the spool member 22, thus increasing the torque between the ball and the housing. This interference fit between the spool and the ball is exactly the arrangement embodiments of the present invention avoid. The requirement for a non-interference fit between the ball and bushing in arrangements embodying the present invention is the technical feature which prevents any increase in torque between the composite ball and the housing. The interference fit, as disclosed in US '122, causes the undesirable variation (increase) in torque. Even with the alternative arrangement disclosed in the passage from line 68 of column 4, to line 4 of column 5 of US '122, where the threading is only provided on a portion of the inner surface of the spherical surface and the outer surface of the spool member 22, the same problem is still experienced.

The provision of the bushing in the bore of the composite ball offers a bearing surface for the shaft to contact with. Preferably, the material of the bushing is different to the material of the split ball portions. Advantageously, the material of the bushing offers more suitable wear characteristics than the material of the bore of the composite ball. These wear characteristics are preselected to be suitable to the material of the shaft to be inserted in the bushing. Thus, in operation, the amount of wear experienced between the bushing and the shaft should be less than the wear that would be experienced if a bushing were not to be used. Advantageously, should wear occur, however, on the bushing, it can merely be replaced by a new bushing without the need to scrap the entire spherical bearing arrangement.

There is little or no torque present between the outer cylindrical surface of the bushing and the inner cylindrical bore surface of the composite ball. The abutment of the at least one stop against at least one axial end face of the composite ball will preferably offer a torque higher than any torque that might be present between a shaft inserted in the bore and the inner bushing bearing surface. Consequently, in use, the bushing will preferably not rotate relative to the composite ball and thus there will be little or no wear of the composite ball bore bearing surface.

A further advantage of embodiments of the present invention is that the mechanics of inserting a shaft into the composite ball is simplified since the split ball portions are effectively sleeved by the bushing so as to present an aperture for the shaft without discontinuities. Consequently, the split ball portions will not misalign in the bearing housing during transportation or installation of the bearing arrangement because of the bushing holding the split ball portions in their assembled configuration.

Whilst the examples hereinbefore described prescribe the provision of two, identical, split ball portions, it will be readily appreciated that the present invention is not limited to such an arrangement. Indeed, there can be provided more than two split ball portions without departing from the essence of the present invention. Moreover, the split ball portions need not be identical to each other. Thus, there could be provided three split ball portions: one portion comprising a "half-ball"; and the two other split ball portions comprising a "quarter-ball" respectively. The assembly of such an arrangement could comprise the separate insertion of the two quarter balls, followed by the insertion of the half-ball; or, alternatively, the initial insertion of the half-ball, with the subsequent insertion of the two quarter-balls simultaneously. However, a person skilled in the art will readily appreciate that the number and shape of the split balls is not essential to the realisation of the present invention.

Whilst the respective separation faces of the above example are frictionally engaged with one another—i.e. there is little or no gap therebetween—it is also envisaged that a gap could be present. It will be readily appreciated by someone skilled in the art that the presence/lack of a gap between the separation faces is insignificant to the realisation of the present invention. However, should there exist a substantial gap, then the aforementioned problems associated with misalignment will be further compounded, and the benefits of the present invention even more apparent. Pleasingly, with a bushing inserted in the composite ball, no splits or cracks are present in the surface presented to the external surface of the shaft—thus any lubricant between the shaft and the bushing surface will not be lost between splits or cracks in the composite ball.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

We claim:

1. A spherical bearing arrangement comprising:
   a bearing housing;
   a plurality of split-ball portions which are together arranged in the housing to produce a composite ball having a spherical bearing surface, the composite ball having a cylindrical bore passing theretbrough, the bore having a central axis; and
   a cylindrical bushing secured with a non-interference fit in the bore of the composite ball, the bushing having a stop located at each axial end;
   wherein one of said stops comprises a threaded portion on an outer surface of the bushing proximate an axial end of the bushing, with which a respective nut is engaged, and the other of said stops comprises a flange that projects radially outwardly from the outer surface of the bushing proximate the other axial end of the bushing.

2. A spherical bearing arrangement according to claim 1, wherein there is no separation between the split-ball portions.

3. A spherical bearing arrangement according to claim 1, wherein there is separation between the split-ball portions.

4. A spherical bearing arrangement according to claim 1, wherein the bushing is secured in the bore of the composite ball so as to prevent axial displacement of the bushing in the bore.

5. A spherical bearing arrangement according to claim 1 wherein movement between the respective nut and threaded portion is locked.

6. A spherical bearing arrangement according to claim 5, wherein the nut is locked to the threaded portion by a peg inserted in a hole at the interface of the nut and the threaded portion.

7. A spherical bearing arrangement according to claim 1, wherein at least one of said stops is a flange.

8. A spherical bearing arrangement according to claim 1, wherein the split-ball portions are substantially identical to each other.

9. A spherical bearing arrangement according claim 1, wherein there are two split-ball portions.

10. A spherical bearing arrangement according to claim 1, wherein the bushing comprises a material that is different than that of the composite ball.

11. A spherical bearing arrangement according to claim 10, wherein a shaft is to be inserted into the bushing and the bushing comprises a material pre-selected so as to minimize wear between the bushing and shaft.

12. A spherical bearing arrangement according to claim 1, wherein the bushing is made of copper or a copper alloy.

13. A spherical bearing arrangement according to claim 1, wherein the composite ball is made of titanium or a titanium alloy.

14. A spherical bearing arrangement according to claim 1, wherein the bearing housing is provided with at least one lobe to secure the bearing housing to another object.

15. A method of assembling a spherical bearing arrangement, the arrangement comprising a bearing housing; a plurality of split-ball portions; and a cylindrical bushing having a stop located at each axial end, one of said stops comprising a flange that projects radially outwardly from an outer surface of the bushing proximate one of said axial ends of the bushing, the method comprising:

inserting the plurality of split-ball portions into the bearing housing so as to define a composite ball having a cylindrical bore passing therethrough;

securing the bushing with a non-interference fit into the bore of the composite ball; and engaging a nut on a threaded outer surface portion of the bushing proximate the other axial end of the bushing to form the other of said stops.

16. A method of assembling a spherical bearing arrangement according to claim 15, wherein the plurality of split-ball portions are inserted into the bearing housing sequentially, prior to securing the bushing in the bore.

17. A method of assembling a spherical bearing arrangement according to claim 15, wherein the bushing is secured in the bore of the composite ball so as to prevent axial displacement of the bushing in the bore.

18. A method of assembling a spherical bearing arrangement according to claim 15, wherein there is no separation between the split-ball portions.

19. A method of assembling a spherical bearing arrangement according to claim 15, wherein there is separation between the split-ball portions.

* * * * *